United States Patent [19]
Breish

[11] Patent Number: 5,845,018
[45] Date of Patent: Dec. 1, 1998

[54] METHOD AND APPARATUS FOR TRANSFERRING MULTIPLE SCANNED IMAGES FROM A FIRST MEDIUM TO A SECOND MEDIUM

[75] Inventor: Kurt Breish, Garden Valley, Id.

[73] Assignee: SunRise Imaging, Inc., Fremont, Calif.

[21] Appl. No.: 594,338

[22] Filed: Jan. 30, 1996

[51] Int. Cl.$^6$ ..................................................... G06K 9/36
[52] U.S. Cl. ........................................................... 382/276
[58] Field of Search ..................................... 382/164, 171, 382/173, 175, 179, 178, 190, 199; 358/448, 443, 450, 471, 452, 447

[56] References Cited

U.S. PATENT DOCUMENTS 4,591,904  5/1986  Urabe et al. ............................... 358/75
5,194,969  3/1993  DiFrancesco ........................... 358/463

*Primary Examiner*—Thomas D. Lee
*Assistant Examiner*—Jerome Grant, II
*Attorney, Agent, or Firm*—Burns, Doane, Swecker & Mathis, LLP

[57] ABSTRACT

The present invention is directed to a method and apparatus for scanning multiple images located on a first medium so that they can be automatically stored on a second medium with a high degree of accuracy and reliability, without the need for highly skilled operators to relocate and rescan images of the first medium which were improperly scanned or missed entirely. According to exemplary embodiments of the present invention, multiple images are scanned from a first medium as a block of image data so that cut, cropped or missed images, as detected by the user at the quality assurance station, need not be rescanned.

10 Claims, 6 Drawing Sheets

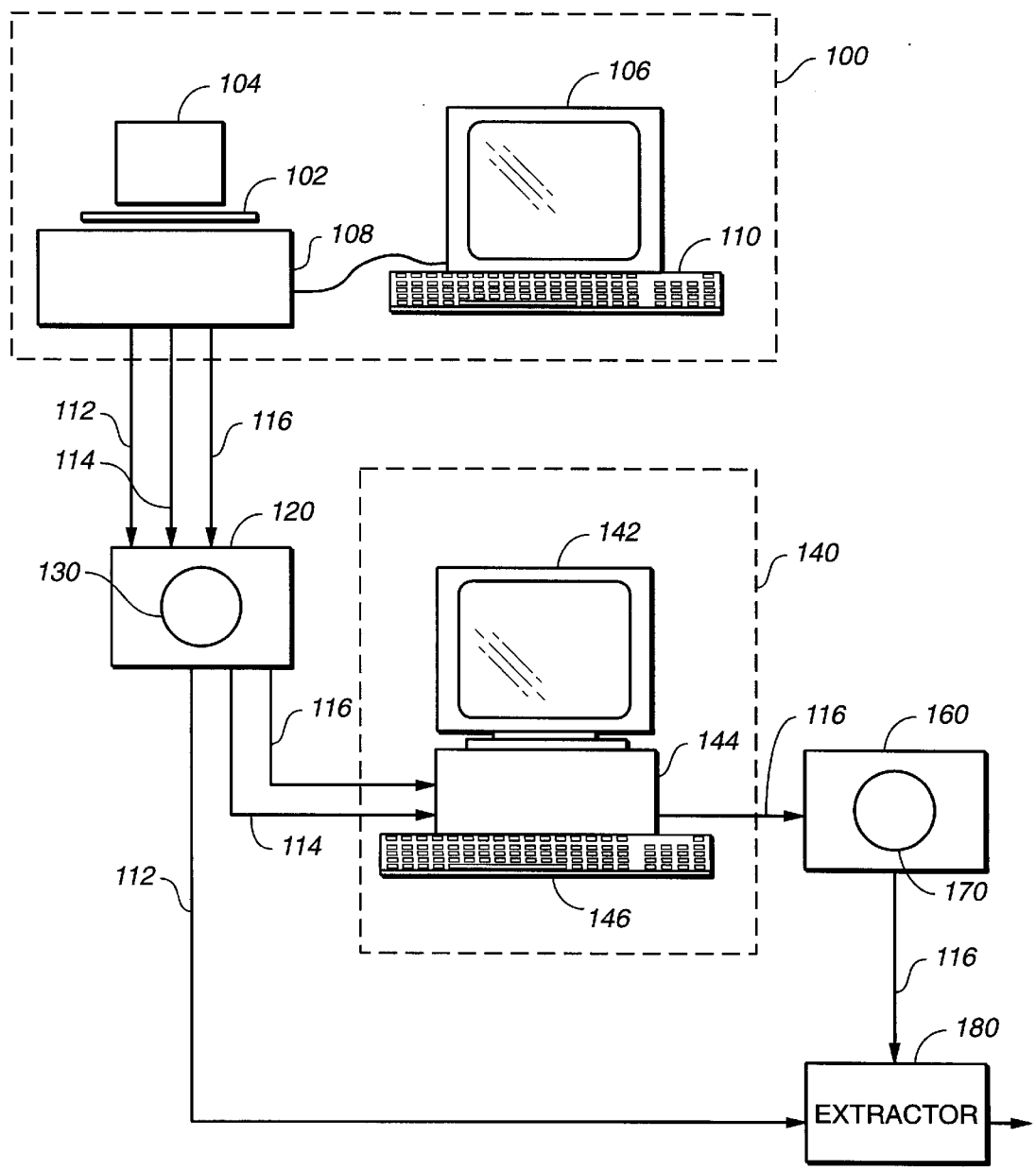
FIG._1

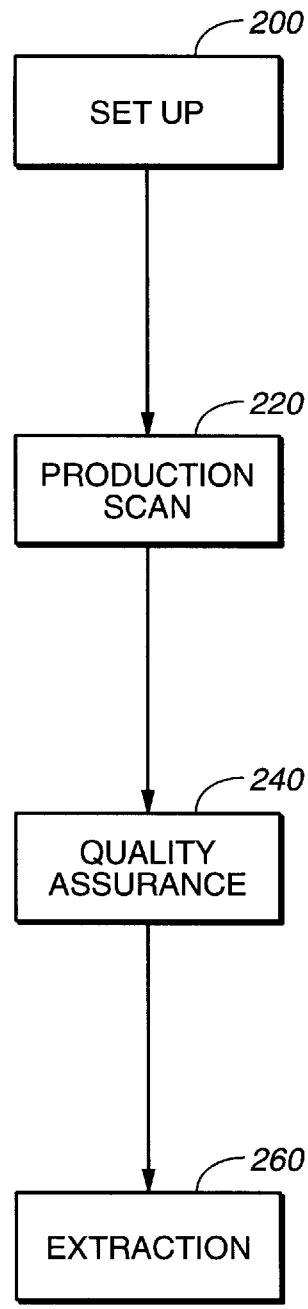
FIG._2
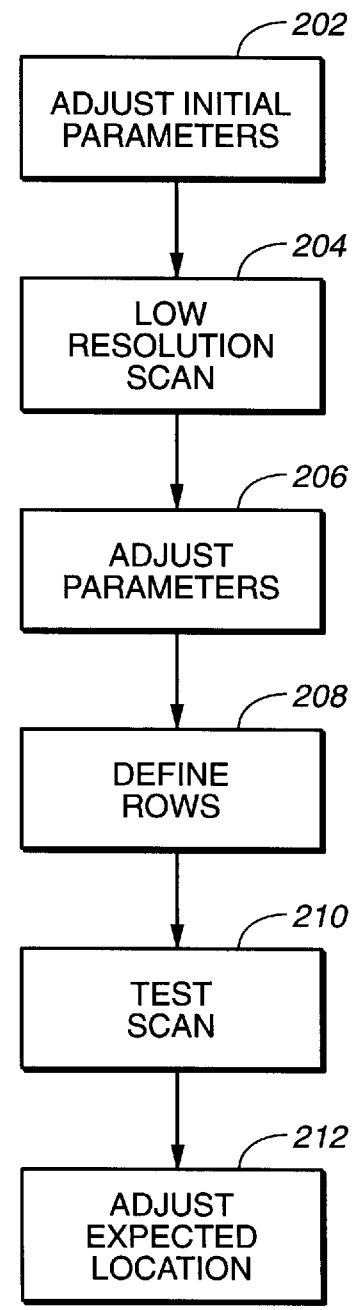
FIG._3

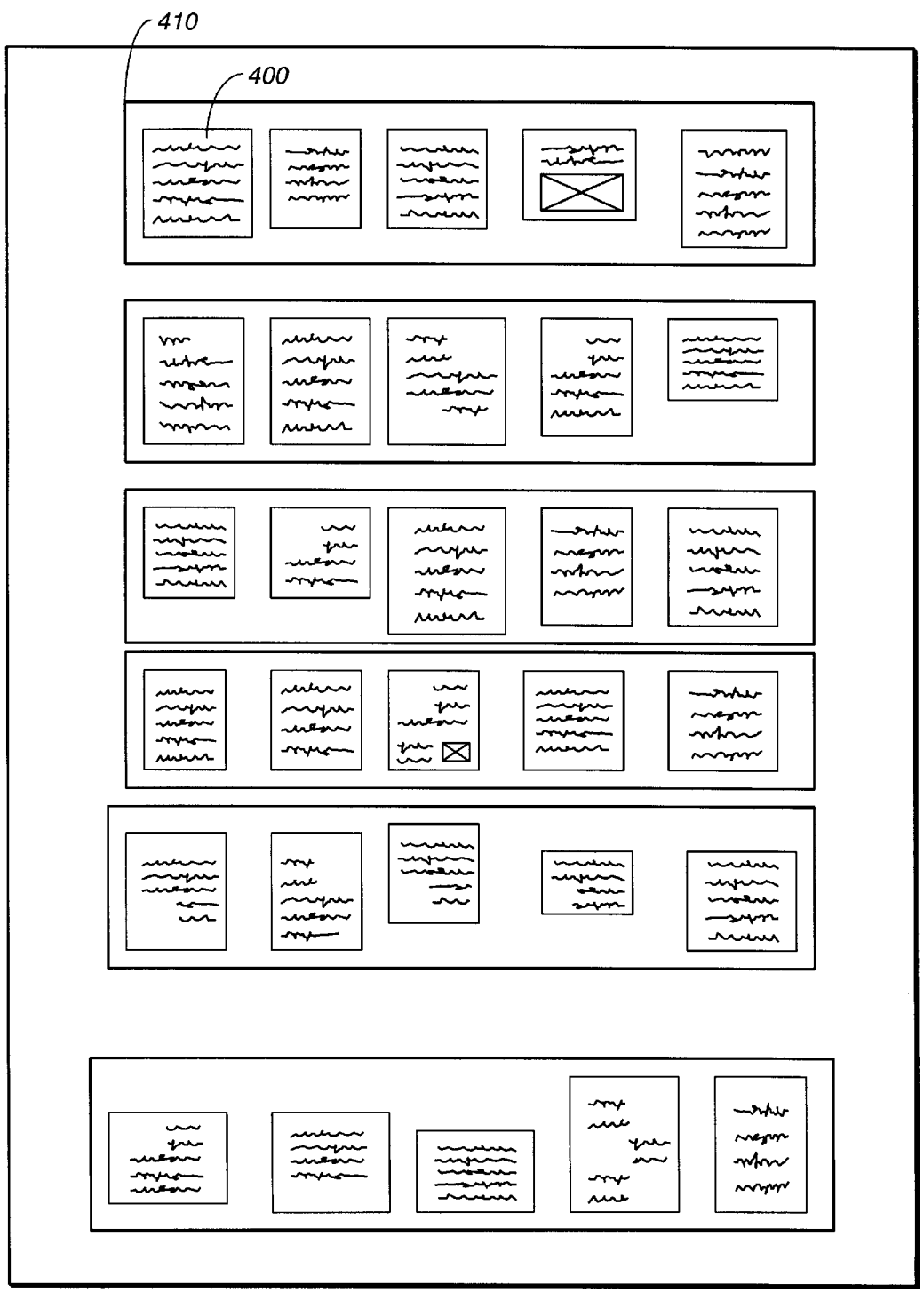
FIG._4

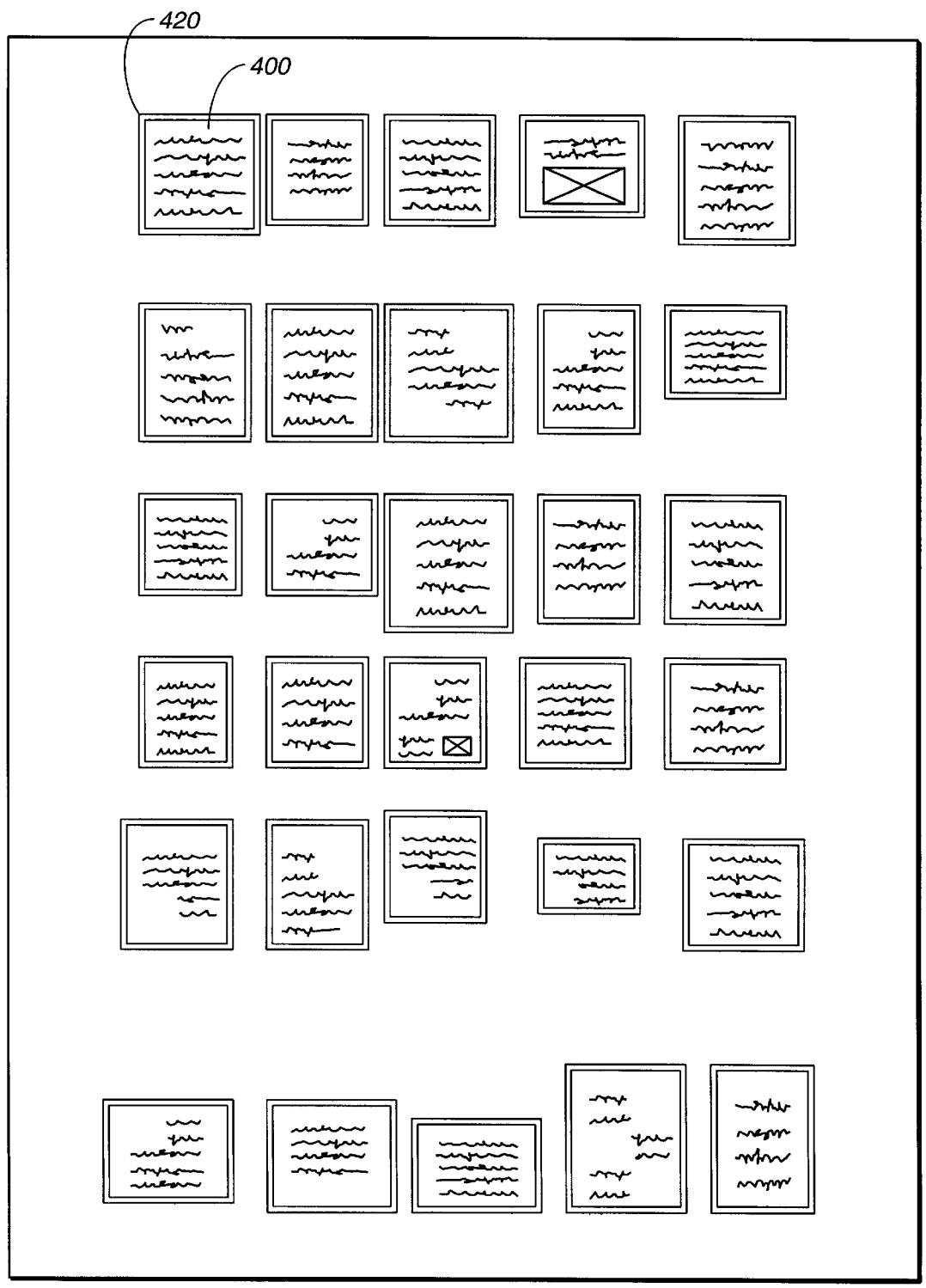
FIG._5

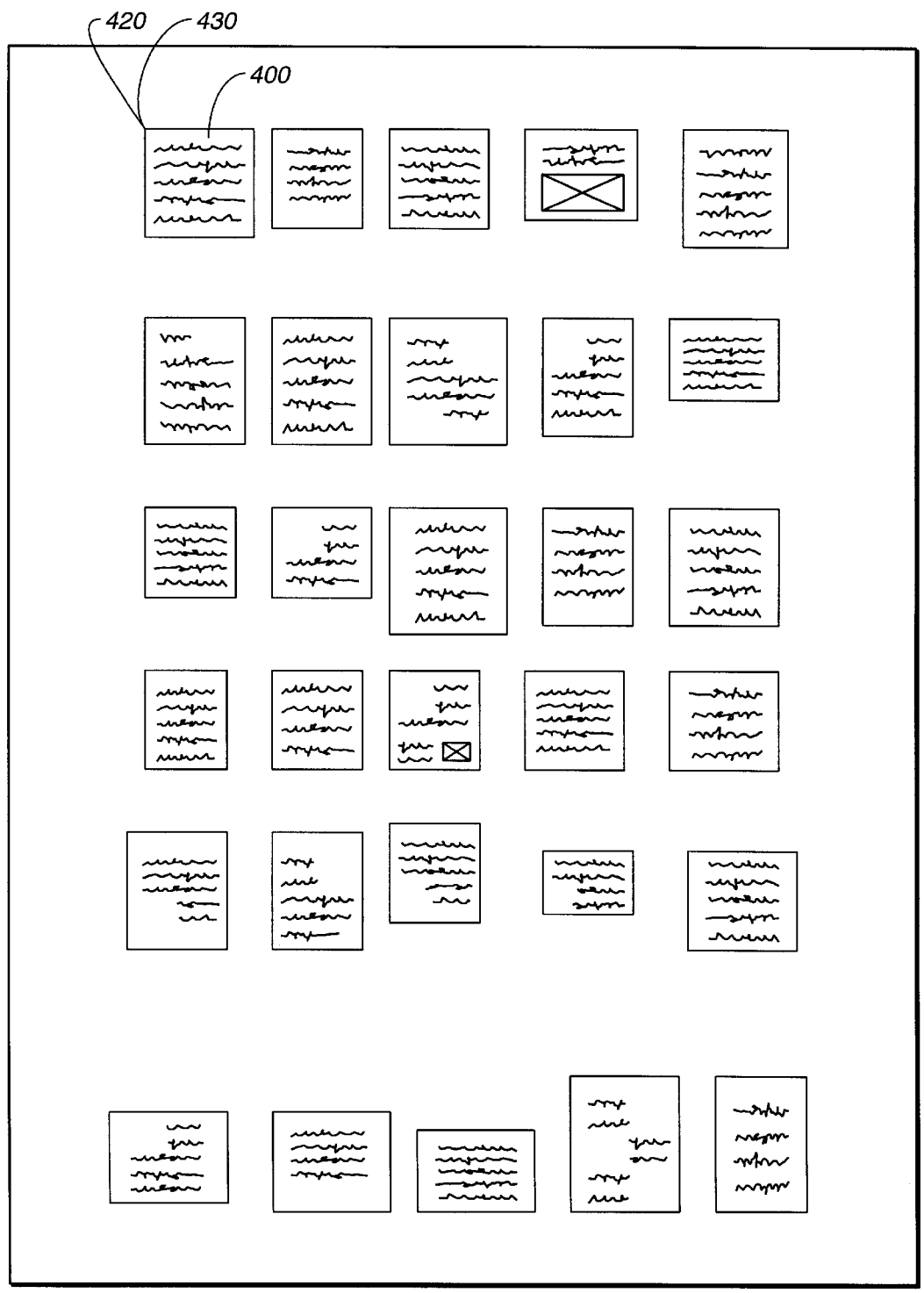
FIG._6

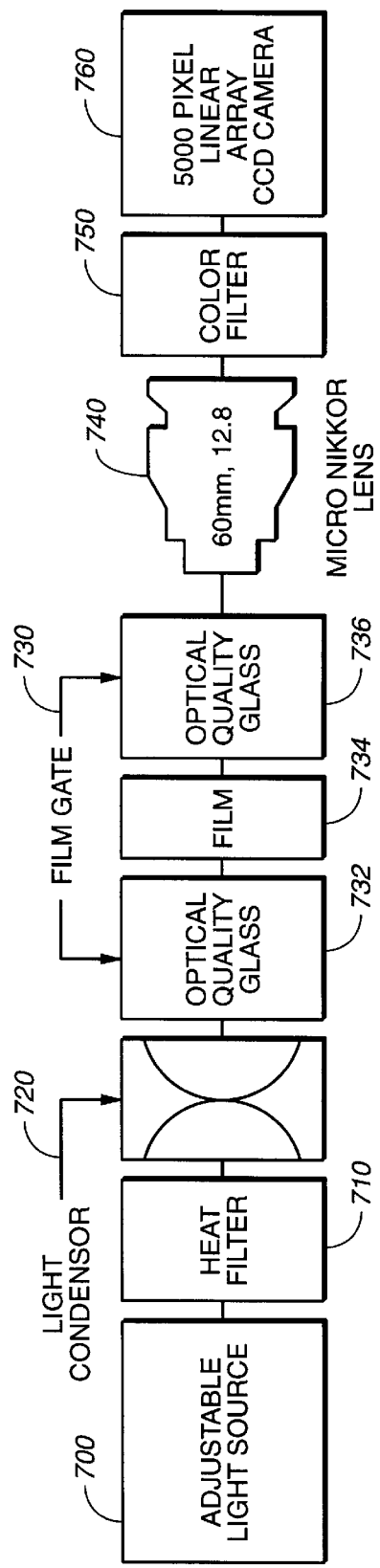
FIG._7

METHOD AND APPARATUS FOR TRANSFERRING MULTIPLE SCANNED IMAGES FROM A FIRST MEDIUM TO A SECOND MEDIUM

BACKGROUND OF THE INVENTION

1. Field of the Invention

The present invention relates to a method and an apparatus for transferring multiple scanned images from a first medium to a second medium. More particularly, the present invention relates to a method and apparatus for transferring multiple images from a first image-based medium as a block of scanned image data, storing the block of image data as digital data, and processing the digital data to produce individual, segmented images on a second medium.

2. State of the Art

To meet the growing need for efficient storage and easy access to information, image scanners have become increasingly popular for scanning and storing each of multiple images from a first image-based medium (such as microfilm or microfiche) in a digital format on a second medium (such as an optical disk). However, present systems and methods for transferring image data from a first medium to a second medium are complex and time consuming, thereby requiring highly skilled operators.

More particularly, where text information is stored on microfiche as a plurality of individual images (e.g., pages of a newspaper stored as microfiche images), each page is typically stored as an image frame on the microfiche. Known systems for transferring these images onto a second medium, such as an optical disk, scan each frame of the microfiche so that each image frame is individually stored in memory as high resolution digital image information. The digital image information can then be converted into a computer recognizable text format using conventional optical character recognition processing. As those skilled in the art will appreciate, the converted text information delivered from the multiple microfiche image frames can then be searched for specific information using, for example, key words.

To properly scan the microfiche images for high resolution storage in memory, the scanner must first be able to accurately locate the images on the microfiche. If the images are not accurately located, any number of the resulting scanned images may be cut, cropped or missed entirely. The storage of high resolution digital information associated with microfiche images which have been cut, cropped or missed is unacceptable.

The use of a scanner to automatically locate each of the microfiche images becomes more complicated when different images of different formats are to be scanned from the same microfiche or series of microfiche. For example, the images may be different sizes or at different orientations on the medium. Further, other objects or marks on the microfiche can make it difficult for a scanner to automatically locate each of the individual images. For example, there may be undesired lines or marks between images, such as a film splice between two images which can easily be mistaken by a scanner as an image edge or boundary. These marks and/or splices thus make it difficult for a scanner to automatically locate each of the actual images on a medium.

Given the difficulties which can be encountered in identifying the locations of individual images on a microfiche, conventional scanners are adjusted by highly trained operators to set edge detection parameters used to determine the boundaries of each image. Once these boundaries have been determined, known systems for transferring film or microfiche images onto disk memory scan all images on the film or microfiche with a high resolution scan. The stored, high resolution image data is then supplied from the scanning station to a quality assurance station, where the boundary information for each image can be reviewed by the operator. The quality assurance station is important, because even when the edge detection parameters are set by a highly trained operator, individual images may be cut, cropped or missed during a production run. When viewing the scanned images at the quality assurance station, if the operator determines that any of the original images have been cut, cropped, missed, or improperly scanned in any way, the original microfiche must be reloaded into the scanner, and the skilled operator must locate the missed or improperly scanned image so that it can be rescanned to acquire a complete high resolution image. At that time, the skilled operator might also adjust parameters of the scanner to avoid the same problem from occurring when other microfiche are successively loaded into the scanner during a production run. The results of the rescan operation can again be reviewed by the operator at the quality assurance station. This process must be repeated until each of the original images has been located and scanned for each microfiche processed in the production run.

Because conventional data transfer systems which use a scanner to transfer image data from a first image based medium to a second data based medium require constant monitoring by highly trained operating personnel, they are slow, operator intensive systems which are impractical for widespread consumer use. Accordingly, there is a need for an image data transfer system that is able to accurately locate and scan images stored on an image-based medium quickly, simply and accurately, without requiring the complexities associated with relocating and rescanning original images, to thereby avoid the need for highly skilled operators.

SUMMARY OF THE INVENTION

The present invention is directed to a method and apparatus for scanning multiple images located on a first medium so that they can be automatically stored on a second medium with a high degree of accuracy and reliability, without the need for highly skilled operators to relocate and rescan images of the first medium which were improperly scanned or missed entirely. According to exemplary embodiments of the present invention, multiple images are scanned from a first medium as a block of image data so that cut, cropped or missed images, as detected by the user at the quality assurance station, need not be rescanned.

More particularly, the images are initially scanned by a scanning device which has been adjusted according to parameters set during a set up phase. Using initial parameters of the scanning device, a low resolution scan of the multiple images on the first medium is performed during the set-up phase. Parameters of the scanning device are then adjusted based on the low resolution scan, and boundaries for defining a block of image data are defined. The parameters are also set to define expected boundaries of the individual images within the block. Once the set up phase is complete, the block of multiple images is scanned and buffered as high resolution digital data.

In accordance with a significant feature of the present invention, data derived from the high resolution digital data (e.g., every eighth bit of the high resolution data) is supplied to the quality assurance station. The data sent to the quality assurance station is used to produce a display of all scanned images from the first medium. Further, expected boundary information for each individual image is supplied to the quality assurance station so that the user can view images for which expected boundaries exist. The digital data is processed to adjust the expected boundaries of the individual images so that they match the actual boundaries, and the adjusted expected boundaries are stored. Images for which no expected boundaries existed need not be placed back into the scanning device and rescanned, since the image data was acquired and stored as a block of data. Rather, the block of stored digital data is merely reprocessed to segment the block of image data into the individual multiple images based on the adjusted expected boundaries thereby redefining portions of the block of image data which correspond to each of said multiple images. The adjusted expected boundaries can then be correlated to the individual stored images so that the images can be accurately retrieved from the second medium. Further, the adjusted expected boundaries can be used to process subsequent microfiche of similar format during a production run.

Generally speaking, exemplary embodiments relate to a method and apparatus for transferring multiple images from a first image-based medium to a second data-based medium by: scanning said multiple images from said first medium as a block of image data; storing said block of image data as digital data on the second medium; processing said digital data to segment said block of image data into said multiple images; viewing expected boundaries of said multiple images of said segmented block of image data; and adjusting said expected boundaries to redefine portions of said block of image data which correspond to each of said multiple images.

BRIEF DESCRIPTION OF THE DRAWINGS

The present invention can be further understood with reference to the following description and the appended drawings, wherein like elements are provided with the same reference numerals. In the drawings:

FIG. 1 illustrates an exemplary scanning system according to the present invention;

FIG. 2 is a flowchart illustrating the overall scanning process according to the present invention;

FIG. 3 is a flowchart illustrating the set up phase of the scanning process according to the present invention;

FIG. 4 illustrates exemplary detected data from a low resolution scan of multiple scanned images on a microfiche during an exemplary set up phase of the scanning process according to the present invention;

FIG. 5 illustrates exemplary detected data from a test scan of multiple scanned images on a microfiche during a scanning process according to the present invention;

FIG. 6 illustrates exemplary detected data from multiple scanned images on a microfiche during a quality assurance phase according to the present invention; and FIG. 7 illustrates an exemplary device for scanning that can be employed in the scanning system according to the present invention.

DETAILED DESCRIPTION OF THE PREFERRED EMBODIMENTS

FIG. 1 illustrates an exemplary system for transferring scanned image data from a first, imaged-based medium to a second, data-based medium according to the present invention. Referring to FIG. 1, images on a medium such as a microfiche 102 are scanned by a scanning device 104 in a set up station 100. Those skilled in the art will appreciate that in accordance with an exemplary embodiment, multiple scanning devices 104 can be used to scan multiple microfiche simultaneously. In the set up station 100, various parameters of the scanning device 104 can be adjusted, including for example the contrast, reduction ratio, and so forth.

In accordance with the present invention, the scanning device 104 can be adjusted to accurately locate and scan a block (e.g., row) of images on the microfiche 102 as one large image. Parameters of the scanning device 104, such as the expected image height and image width for each image frame can be adjusted in the set up station 100 to define where the user expects the individual images on the microfiche to appear, in a manner as described in commonly assigned, copending U.S. application Ser. No. 08/541,550 (Attorney Docket No. 026437-008), the contents of which are hereby incorporated by reference in their entirety. As described in the copending application, an edge detection threshold can also be established to specify characteristics for detecting an image boundary.

The parameters of the scanning device 104 can be adjusted, for example, by viewing a display of the multiple images on a monitor 106 to determine if the parameters have the desired values. The detected data obtained from a low resolution scan of the microfiche is displayed on the monitor 106 and examined to determine whether it satisfies predetermined criteria. If the detected data does not satisfy the predetermined criteria, a parameter can be adjusted (i.e., reselected) using user input means, such as a keyboard 110 or a mouse. The set up station 100 can further comprise means, such as a processor 108, for controlling the scanning device 104 in response to the detected data. The adjusted parameter can be output from the processor 108 to adjust the scanning device 104, and the detected image data can be modified until the detected data satisfies the predetermined criteria.

Once the parameters for the scanning device have been set in a manner similar to that described in the copending application, a parameter is also set to define what will constitute a "block" of image data. Using the block information, the scanning device 104 then performs a high resolution scan of the microfiche 102. According to an exemplary embodiment, the images are blocked into rows, and the microfiche is scanned row by row in a serpentine fashion (that is, a first block corresponds to a row scanned left to right across the microfiche, while a second block corresponds to a second row of images scanned right to left).

The set up station 100 outputs the scanned image data for each row as full resolution digital data that is stored as a bit map in a storage device 120. The full resolution scan data, is output across line 112. In an exemplary embodiment, image data derived from the full resolution scan data, such as ⅛ resolution scan data (that is, every eighth bit of the full resolution scan data), is output across line 114. The set up station also outputs expected image boundaries across line 116, based on detected image edges and on parameters such as image height and width input which were set during the set up phase. The storage device 120 can comprise, for example, a disk 130. The image data output from one or more scanning devices in the set up station 100 is stored in a queue of storage device 120.

The ⅛ resolution scan data and the expected row boundaries are sent to or retrieved by, a quality assurance station 140 via lines 114 and 116, respectively. At the quality assurance station 140, the ⅛ resolution scan data corresponding to a block of images on the microfiche (or, if processing at the quality assurance station is delayed until all rows have been scanned, an entire microfiche) is displayed with computer superimposed boundaries indicating the expected boundaries of each individual image. A user can then adjust the expected boundaries of the images by, for example, viewing the display of multiple images with the superimposed expected boundaries on a monitor 142. The user can easily determine if the expected boundaries match the actual boundaries of the images or if expected boundaries have not been superposed on one or more of the individual images. If the superimposed expected image boundaries have not been supplied or do not match the actual image boundaries, the stored expected image boundaries can be adjusted by the user via a processor 144 in response to a user input via, for example, a keyboard 146 or a mouse. For example, the expected image boundaries can be shifted right or left, shifted up or down, and/or enlarged or reduced using simple mouse movements. Where expected boundaries have not been supplied for a given image, the user can add the expected boundaries to the display by, for example, moving a cursor (via a mouse) to a predetermined location on the image (e.g., the upper left hand corner) and then depressing an actuator on the mouse to produce a computer display of expected boundaries about the image; these boundaries can, of course, be adjusted to ensure that no portion of the image is cut or cropped.

In accordance with a significant aspect of the present invention, an untrained user can thus assess the quality of the image detection by the scanning device 104, and correct apparent errors in expected boundaries. Because multiple images of the microfiche have been scanned, stored and transferred to the quality assurance station as a block of data, the user will immediately observe when the parameters of the scanning device were set to values which inhibited accurate boundary detection for all of the individual images. Expected image boundaries can then be added or adjusted to redefine portions of the block of image data which correspond to each of the multiple images, so that proper boundary data can be stored for each image and so that subsequently processed microfiche can be properly scanned at high speed and correlated to proper boundary data. In accordance with a significant aspect of the present invention, when the user adds or adjusts boundaries of a particular image which were not properly recognized at the scanning device, the image data which would have been cut, cropped or misfed need not be rescanned. Rather, because the individual images were scanned with high resolution in blocks, the high resolution image data buffered in storage device 120 merely needs to be resegmented into appropriate images and correlated to the proper boundary data as verified at the quality assurance station.

Thus, the microfiche need not be replaced into the scanning device so that a highly trained operator can relocate and rescan any cut, cropped or missed images. Further, while the user can adjust the parameters previously set during the set up phase to address the failure of the scanning device to properly detect image boundaries, exemplary embodiments eliminate this readjustment by automatically modifying expected boundaries based on the user's correction of expected boundaries at the quality assurance station. For example, the expected boundaries of a missed image, once added by the user at the quality assurance station, can be supplied to the scanning device for processing subsequent microfiche.

For example, consider a block of image data which includes ⅛ resolution scan data for each of 10 individual microfiche images. Assume that because the edge detection threshold was set relatively high, the boundaries of one of the 10 individual images was not detected (e.g., because the image did not include a sharp, well-defined edge characteristic). Consequently, when the data is transferred to the quality assurance station, an expected image boundary will be superposed around each of the nine detected images. However, no such expected image boundary will be superposed around the undetected image. The user will immediately recognize this, and via the mouse, add expected image boundaries to the previously undetected image. This information can then be supplied to the scanning device. Thus, the user can be assured during a subsequent production run, wherein multiple microfiche are successively placed into the scanning device and scanned, that image data and expected boundary data for all of the individual images will be stored.

Once the expected image boundaries for all images on a given microfiche are deemed acceptable (that is, an expected image boundary is superposed over all of the displayed images), the adjusted expected image boundaries are output and stored in a queue of storage device 160. The storage device 160 can comprise, for example, a disk 170. Although shown as a separate device, the storage device 160 can be the same device used as the storage device 120.

The adjusted image boundaries are retrieved from the storage device 160 by an extraction station 180 via the line 116. Full resolution scan data for each of the scanned images is retrieved from the storage device 120 by the extraction station 180. At the extraction station 180, the images within each full resolution scanned row of images are segmented into individual images according to the adjusted image boundaries. The segmented full resolution scan images are output from the extraction station 180 to a storage device such as a hard disk, an image server, a video tape, a tape such as a nine track tape, an optical disk or any other data based medium from which the individual images can be easily accessed on demand.

As subsequent microfiche are processed during a production run, it is unlikely that problems in detecting expected boundaries will recur. Thus, when the image data of subsequent microfiche is reviewed by the user at the quality assurance station, expected boundaries are highly likely to be properly superposed about each of the individual images. If so, the user can activate an indicator (e.g., via a keyboard key or the mouse) to confirm that expected boundaries match actual boundaries as each subsequent microfiche is processed. The full resolution image data and expected boundaries for each image can then be correlated in the extraction station so that high resolution individual images can be quickly, easily and accurately retrieved from the second medium on demand. During the processing of subsequent images in a production run, if any errors in expected boundaries are noticed by the user, the corrective measures described previously can be quickly and easily taken by the user without the user having to replace the original microfiche into the scanner, located the affected images, rescan the affected images and then adjust parameters of the scanning device.

Although shown as separate devices, the portions of the image scanning system shown in FIG. 1 can of course, be incorporated into a single device. Also, the portions of the image scanning system can share common elements. For example, the set up station 100 and the quality assurance station 140 can share one storage device, one monitor, one processor and one keyboard and/or mouse. The monitor can be implemented as any display device including, for example, a 20" monitor and an S3 PCI High Resolution Display Controller Card. The processor can be implemented with any processor including, for example, an INTEL Pentium ™ 90 Mhz processor and a PCI PC/AT Motherboard.

The portions of the image scanning system communicate with each other via the storage devices, informing each other when they have completed a task and when they are available for performing a new task. Also, the different portions can perform their respective tasks at the same time or at different times. For example, while the quality assurance station is adjusting the quality for one production scan, the extraction device can extract the individual images and associated boundary data for another production scan.

FIG. 2 is a flowchart illustrating an exemplary scanning process according to the present invention. As shown in FIG. 2, the scanning process begins with a set up phase 200, in which various parameters of the scanning device are set up, including, for example, the contrast, the reduction ratio, the boundaries of image blocks, and the expected boundaries of the individual images. Next, at step 220, a production scan of the images on the microfiche is performed. During this step, image data (e.g., multiple images) is scanned from the microfiche in blocks (e.g., row by row) and stored in the storage device along with the row boundaries and the expected image boundaries. The scanned images are stored in a queue, and the user can provide labels and batch numbers to distinguish the images of a current production scan from those of other production scans.

Next, the quality of the segmentation of blocks of image data into individual images is determined and adjusted at a quality assurance phase 240. In this phase, the user views the image data derived from the full resolution image data (e.g., ⅛ resolution data) and adjusts or adds, if necessary, the expected boundaries of each image. The image data is displayed with reduced resolution because not all of the full resolution detail is needed to determine whether the expected image boundaries match the actual image boundaries. Also, displaying reduced resolution scan data consumes less memory and can be performed faster than displaying the full resolution scan data. Further, the use of reduced resolution data allows a larger number of "thumbnail" images from the microfiche to be displayed collectively on a lower resolution display. Of course, if a higher resolution display is provided, or if the number of images to be displayed at the same time is reduced, higher resolution images can be viewed during the quality assurance phase.

When the expected boundaries of the images have been adjusted to achieve a satisfactory segmentation of the block of image data, the process advances to the extraction step 260, at which the individual images are automatically extracted, with full resolution, from the row of images. At this step, the individual images of a given production scan can be named with identifiers using, for example, incrementing numbers. The extraction of the individual images is automatic, according to the expected boundaries of the images of the set up phase, as adjusted during the quality assurance step 240. Finally, the extracted images are output and stored as individual scanned images along with the boundary information and the image identifiers. Although the images can be extracted with full resolution, those skilled in the art will appreciate that any desired resolution can be used.

FIG. 3 illustrates in detail, an exemplary set up phase of the FIG. 2 scanning process. As shown in FIG. 3, the set up phase begins with setting initial parameters of the scanning device at step 202. In this step, such parameters as the lamp intensity and a re-arm distance can be set in a manner as described in the aforementioned copending application. Next, a low resolution scan is performed at step 204. At step 206, parameters such as the contrast of the low resolution scan data can be user adjusted by, for example, viewing the low resolution scan data displayed on a monitor, as described in the copending application.

In accordance with exemplary embodiments of the present invention, in addition to setting the foregoing parameters, the boundaries of each block (e.g., each row) of images on the microfiche are defined at step 208. The boundaries of the rows can be user determined by, for example, viewing a monitor and inputting the boundaries via a keyboard.

At step 210, a low resolution test scan is performed of a test microfiche. In accordance with exemplary embodiments, the boundaries of the individual images are initially detected during step 210 using, for example, an edge detection threshold. During step 212, the user adjusts parameters of the scanning device according to expected locations of the individual images. For example, the user can adjust the edge detection threshold, height and width, until the expected image boundaries approximately match the boundaries of the images on the test microfiche in a manner as described in the copending application.

According to an exemplary embodiment of the present invention, the set up phase need only be performed once, as long as the test microfiche is fairly representative of the other microfiches to be scanned. As described previously, provided the other microfiche include images in approximately the same positions as the test microfiche, the set up performed using the test microfiche can be considered to produce high quality image detection for all subsequent microfiche which are processed during a production run, thereby saving valuable time and expense.

FIG. 4 illustrates exemplary detected data from a low resolution scan of multiple images stored on a microfiche during an exemplary set up phase of the scanning process according to the present invention. The data illustrated in FIG. 4 can be obtained during an initial low resolution scan of the multiple images, which is sufficient to determine the boundaries for a block of images (e.g., a row of images). To produce the images of FIG. 4, the user can activate a key on the keyboard which initiates a low resolution scan of all images on the medium (e.g., all images contained on a roll film or microfiche transparency). All such information is stored as a bit map within a memory of the processor. In accordance with an exemplary embodiment, a low resolution scan to provide sufficient information can, for example, be performed with a resolution on the order of 55 dots per inch. The resultant low resolution information is used to produce a display on the monitor which shows one or more of the scanned images. In the FIG. 4 example, the images scanned from a microfiche have been produced on the display as thumbnail images 400. As illustrated in FIG. 4, a block of images can be defined as row boundaries by, for example, positioning a box cursor at the top left corner of a row of images and dragging the box to the right bottom corner of the row of images, defining a superposed row boundary 410 on the display.

FIG. 5 illustrates exemplary detected data from a scan of multiple scanned images on a microfiche to set other parameters during the set up phase. Referring to FIG. 5, detected test scan data is displayed in the context of the entire fiche with superimposed boundaries for each of the individual images. The user can thus view all the images on the fiche in the context of the entire fiche, so that an optimum edge detection threshold can be set for the entire fiche in a manner as described in the aforementioned copending application. The user does not, at this stage, worry about setting the boundaries for each separate image. Rather, the user sets parameters with which the processor determines expected image boundaries. For example, the user selects an edge detect threshold, image height and image width so that the image boundaries are optimum for the largest number of images. The user determines whether the image boundaries are optimal by viewing the expected image boundaries 420 superposed on the display. Once the user has set the expected image boundaries for the test microfiche, other microfiches can be scanned without requiring further set up. Thus, a skilled operator could perform the initial set up of the system, so that an unskilled user can perform production runs and monitor the quality of scanned information at the quality assurance station in the manner described previously.

FIG. 6 illustrates exemplary detected data from multiple images on a microfiche during the quality assurance stage of the high resolution, production run scanning process according to an exemplary embodiment of the present invention. The data displayed at the quality assurance phase illustrated in FIG. 6 can be, for example, derived from the full resolution scan data obtained from the scanning device.

Referring to FIG. 6, the detected data is displayed with adjusted expected individual image boundaries superimposed on the individual images. The screen can be displayed on a monitor at the quality assurance station. As in FIG. 5, the individual scanned images can be viewed in the context of the entire fiche. A comparison of the expected image boundaries with respect to the actual image boundaries can then be performed for each image by comparing the expected image boundaries 420 superposed on the display with the actual image boundaries 430. If an acceptable match is not obtained for all images, or if expected boundaries are not produced for one or more images, the expected image boundaries 420 can be added and/or adjusted until an acceptable match is obtained for all images. Unlike the detected test scan data depicted in FIG. 5 which was obtained by adjusting parameters of the scanning device, the detected data shown in FIG. 6 can be used to actually adjust each expected individual image boundary. Because data from the original microfiche is acquired in blocks, the user need not rescan the microfiche images to acquire complete image data after an adjusted image boundary has been set.

The user may or may not have to adjust the expected image boundaries. The number of adjustments that the user makes at this stage will vary, depending on, for example, the quality of the fiche itself, whether the fiche contains images of different sizes, and whether the images were placed in the jacket in straight rows, and so forth. Once the user has adjusted the individual expected image boundaries, the multiple images can be stored with boundary information in the extraction stage so that any given image can be automatically accessed and/or extracted on command at a later time using, for example, index number attributed to each image at the time it is stored in the extraction stage.

FIG. 7 illustrates an exemplary device for scanning that can be employed within the exemplary scanning system according to the present invention. Referring to FIG. 7, the scanning device can comprise, for example, an adjustable light source 700, a heat filter 710, a light condenser 720, a film gate 730 that includes optical quality glasses 732 and 736 and a microfiche 734, a lens 740, a color filter 750, and a Charge Coupled Device (CCD) camera 760.

The adjustable light source 700 illuminates the microfiche 734 during scanning. The lamp intensity of the light source 700 can be varied from 0% to 100%. The light source 700 has a shutdown mode for prolonged periods of inactivity and thermal shutdown protection in case of reduced air flow.

The heat filter 710 filters out unwanted energy, such as infrared radiation from the light source 700, to prevent leakage and blooming at the CCD camera 760. The light condenser 720 generates a field of uniform light energy at the film 734 that fills the lens 740. The optical quality glasses 732 and 736 secure the microfiche 734 during scanning. The lens 740, for example a 60 mm f2.8 Micro Nikkor lens, magnifies the image to a desired resolution. The color filter 750 matches a light energy wavelength to an optimal CCD spectral response curve.

The CCD Camera 760 scans images represented in analog form and outputs digital data representing the images. The CCD Camera 760 comprises, for example, a 5000 pixel linear array and can output digital data at a rate of, for example, 2800 lines/second. Alternately, the CCD image scanner can be formed with any other desired component, suitable for a given application. For example, a 7500 pixel linear array can also be used.

It will be appreciated by those skilled in the art that the present invention can be embodied in other specific forms without departing from the spirit or essential characteristics thereof. For example, while the embodiments above have been described with reference to a microfiche, the invention is also applicable to other types of media including, for example roll film. Further, while in the embodiments above, the block of image data scanned has been described as a row of multiple images, the block can be any size, including the entire microfiche. For a roll film, the block of image data can include the entire roll. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for transferring multiple images from a first image based medium to a second data-based medium, comprising the steps of:

setting up a device for performing scanning including the steps of performing a low resolution scan of the multiple images, adjusting parameters of the scanning device based on said low resolution scan, defining boundaries of said block based on said low resolution scan, and defining expected boundaries of said multiple images within said block;

scanning said multiple images from said first medium as a block of image data;

storing said block of image data as digital data on the second medium;

processing said digital data to segment said block of image data into said multiple images;

viewing expected boundaries of said multiple images of said segmented block of image data; and adjusting said expected boundaries to redefine portions of said block of image data which correspond to each of said multiple images.

2. The method of claim 1, wherein said first medium is a microfiche and said block of image data is a row of images on the microfiche.

3. A method for transferring multiple images from a first image based medium to a second data-based medium, comprising the steps of:

scanning said multiple images from said first medium as a block of image data;

storing said block of image data as digital data on the second medium;

processing said digital data to segment said block of image data into said multiple images;

viewing expected boundaries of said multiple images of said segmented block of image data including the steps of deriving reduced resolution image data for each of said multiple images from said block of image data and superposing expected boundaries on said reduced resolution image data; and adjusting said expected boundaries to redefine portions of said block of image data which correspond to each of said multiple images.

4. The method of claim 3, further including the steps of:

storing said adjusted expected boundaries for each of said multiple images of said block of image data;

resegmenting said block of image data based on said adjusted expected boundaries; and correlating the multiple images of said resegmented block of image data with said adjusted expected boundaries on said second medium.

5. The method of claim 3, wherein said block of image data is resegmented based on said adjusted expected boundaries of said multiple images within said block.

6. An apparatus for transferring multiple images from a first image-based medium to a second data-based medium comprising:

means for scanning said multiple images from said first medium as a block of image data;

means for setting up said means for scanning including means for performing a low resolution scan of the multiple images, means for adjusting parameters of the means for scanning based on said low resolution scan, means for defining boundaries of said block based on said low resolution scan, and means for defining expected boundaries of said multiple images within said block;

means for storing said block of image data as digital data on the second medium;

means for processing said digital data to segment said block of image data into said multiple images;

means for viewing expected boundaries of said multiple images of said segmented block of image data; and means for adjusting said expected boundaries to redefine portions of said block of image data which correspond to each of said multiple images.

7. The apparatus of claim 6, wherein said first medium is a microfiche and said block of image data is a row of images on the microfiche.

8. An apparatus for transferring multiple images from a first image-based medium to a second data-based medium comprising:

means for scanning said multiple images from said first medium as a block of image data;

means for storing said block of image data as digital data on the second medium;

means for processing said digital data to segment said block of image data into said multiple images;

means for viewing expected boundaries of said multiple images of said segmented block of image data, including means for deriving reduced resolution image data for each of said multiple images from said block of image data and superposing expected boundaries on said reduced resolution image data; and means for adjusting said expected boundaries to redefine portions of said block of image data which correspond to each of said multiple images.

9. The apparatus of claim 8, wherein said block of image data is resegmented based on said adjusted expected boundaries of said multiple images within said block.

10. The apparatus of claim 9, wherein said storing means stores said adjusted expected boundaries for each of said multiple images, said adjusted expected boundaries being correlated with said multiple images of said resegmented block of image data.

* * * * *